United States Patent
Lallemant et al.

(10) Patent No.: US 9,657,843 B2
(45) Date of Patent: May 23, 2017

(54) VALVE FOR CONTROLLING A FLOW OF FLUID, INCLUDING A ROTARY CLOSURE MEANS

(71) Applicant: Valeo Systemes de Controle Moteur, Cergy Saint Christophe (FR)

(72) Inventors: Mathieu Lallemant, Maisons-Laffitte (FR); Franck Girardon, Conflans Sainte Honorine (FR); Patrick Lebrasseur, Montigny en Vexin (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 69 days.

(21) Appl. No.: 14/401,063

(22) PCT Filed: May 7, 2013

(86) PCT No.: PCT/FR2013/051017
§ 371 (c)(1),
(2) Date: Nov. 13, 2014

(87) PCT Pub. No.: WO2013/171409
PCT Pub. Date: Nov. 21, 2013

(65) Prior Publication Data
US 2015/0136259 A1    May 21, 2015

(30) Foreign Application Priority Data

May 15, 2012  (FR) ..................................... 12 54433

(51) Int. Cl.
*F16K 5/04*     (2006.01)
*F16K 1/20*     (2006.01)
(Continued)

(52) U.S. Cl.
CPC ............ *F16K 1/20* (2013.01); *F02B 29/0418* (2013.01); *F02M 26/26* (2016.02); *F16K 5/0407* (2013.01);
(Continued)

(58) Field of Classification Search
CPC ........... F16K 5/0407; Y10T 137/87531; Y10T 137/86863
(Continued)

(56) References Cited

U.S. PATENT DOCUMENTS 3,048,191 A  *  8/1962  Crang ................... F16K 5/0407
                                                    137/625.32
3,471,021 A     10/1969  Prizler
(Continued)

FOREIGN PATENT DOCUMENTS

CH          583 393  A5   12/1976
DE       198 60 637  A1    6/2000
(Continued)

OTHER PUBLICATIONS

International Search Report for corresponding International Application No. PCT/FR2013/051017, mailed Jul. 26, 2013 (3 pages).

*Primary Examiner* — Michael R Reid
*Assistant Examiner* — Christopher Ballman
(74) *Attorney, Agent, or Firm* — Osha Liang LLP

(57) ABSTRACT

The valve comprises: a body (2) through which the fluid flows; and a controllable rotary closure means (3) disposed in the body, which can be rotated in relation to the body in order to occupy different angular positions. Advantageously, the body (2) comprises an inner cylindrical housing (4) having a circular cross-section, and the closure means (3) comprises one portion (14) arranged on a plane inclined in relation to the cylindrical housing (4) and co-operating with the side wall (5) of the housing by means of a peripheral
(Continued)

generatrix, such as to provide a sealed contact between the closure means (3) and the body (2) in at least one angular position.

8 Claims, 8 Drawing Sheets

(51) Int. Cl.
  *F02B 29/04* (2006.01)
  *F16K 11/072* (2006.01)
  *F16K 11/085* (2006.01)
  *F16K 11/052* (2006.01)
  *F16K 11/14* (2006.01)
  *F02M 26/26* (2016.01)

(52) U.S. Cl.
  CPC .......... *F16K 11/052* (2013.01); *F16K 11/072* (2013.01); *F16K 11/085* (2013.01); *F16K 11/14* (2013.01); *Y02T 10/146* (2013.01); *Y10T 137/86863* (2015.04); *Y10T 137/87442* (2015.04); *Y10T 137/87523* (2015.04); *Y10T 137/87531* (2015.04)

(58) Field of Classification Search
  USPC ........................................ 137/601.17, 625.46
  See application file for complete search history.

(56) References Cited

U.S. PATENT DOCUMENTS

| | | | | |
|---|---|---|---|---|
| 4,506,697 A * | 3/1985 | Marchant | ............ | F16K 11/0856 137/240 |
| 4,535,969 A * | 8/1985 | Riley | ........................ | F16K 5/04 251/215 |
| 4,840,028 A * | 6/1989 | Kusuda | ................. | F01N 3/0256 137/597 |
| 5,102,543 A * | 4/1992 | Burroughs | ........... | B01D 35/147 137/625.23 |
| 5,207,246 A * | 5/1993 | Meyer | ................. | F16K 11/0856 137/625.23 |
| 2003/0062500 A1* | 4/2003 | Eggleston | ............... | F16K 1/222 251/306 |
| 2010/0253094 A1* | 10/2010 | Russberg | ................ | F04B 13/02 290/1 R |
| 2011/0095647 A1* | 4/2011 | Russberg | ............... | F16K 11/076 310/306 |

FOREIGN PATENT DOCUMENTS

| | | |
|---|---|---|
| EP | 0 283 240 A2 | 9/1988 |
| FR | 2 241 734 A1 | 3/1975 |
| FR | 2 519 401 A1 | 7/1983 |
| FR | 2 920 853 A1 | 3/2009 |
| WO | 03/098026 A1 | 11/2003 |
| WO | 2008/116789 A1 | 10/2008 |

* cited by examiner

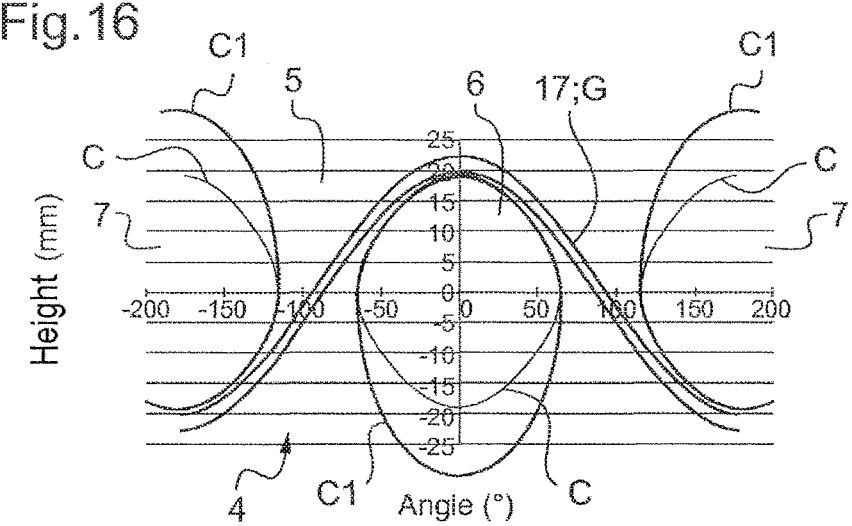
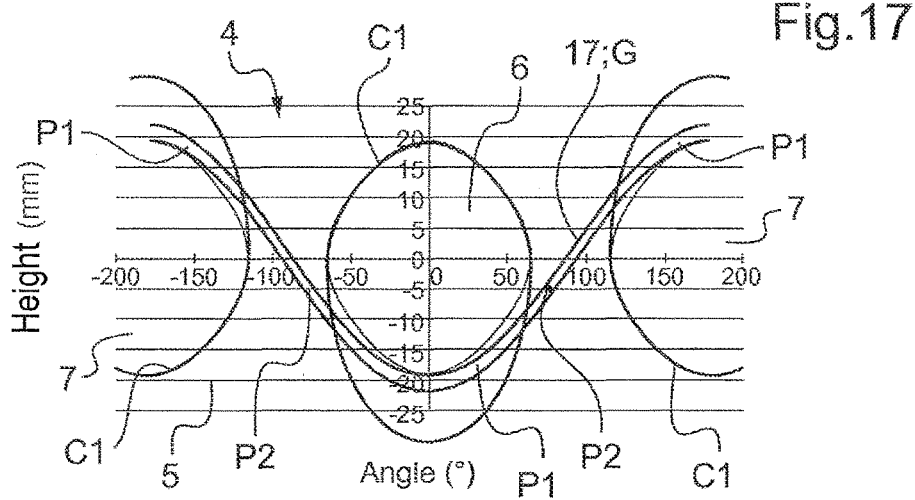
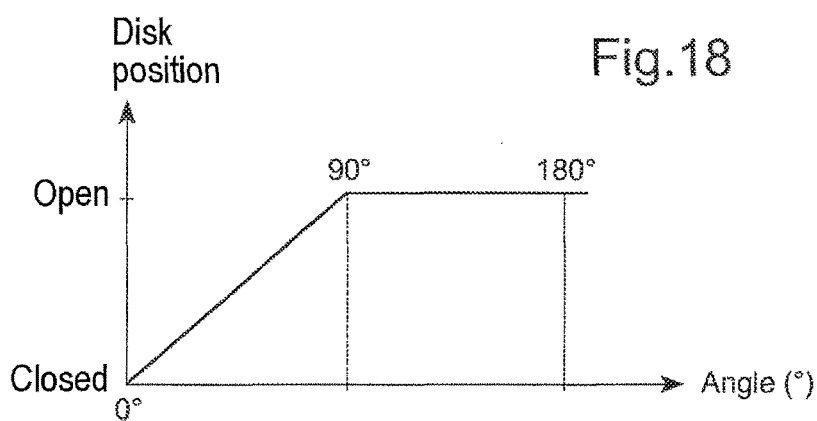

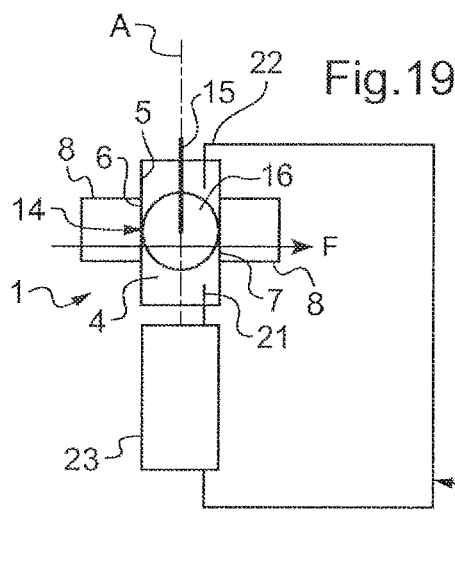
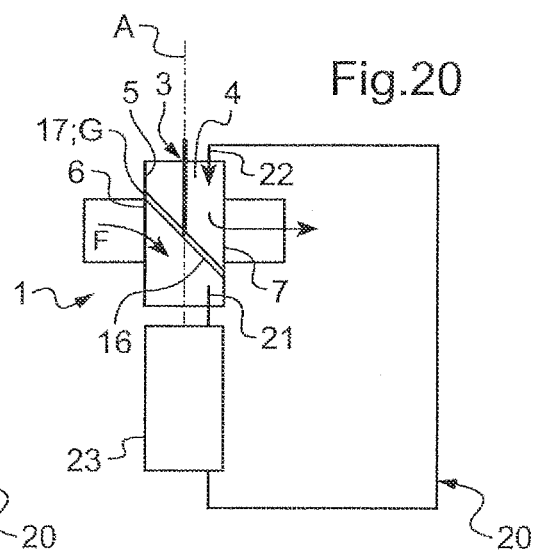
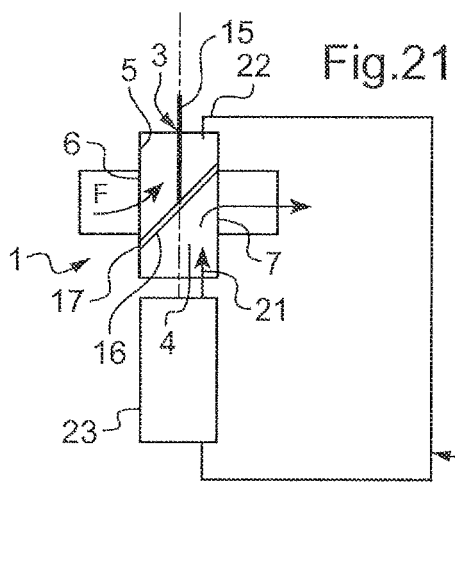
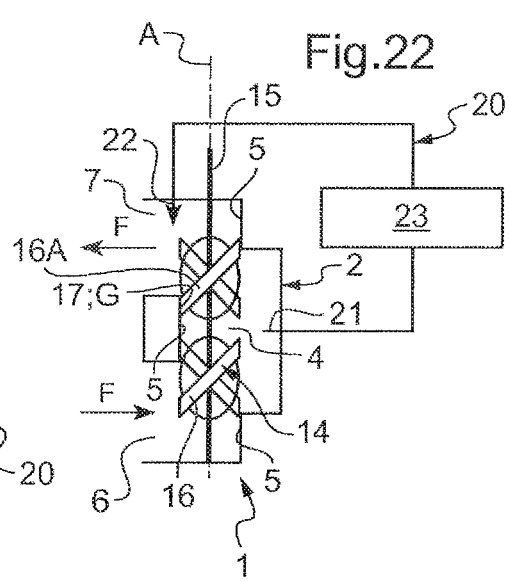
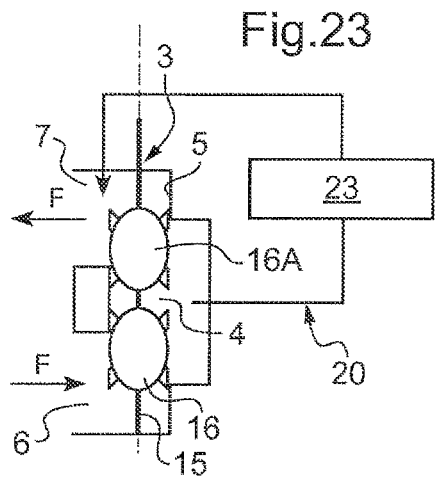
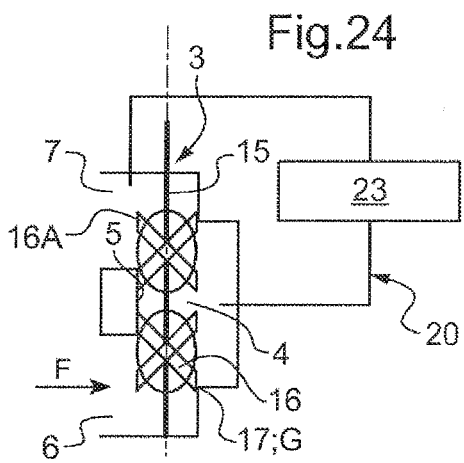

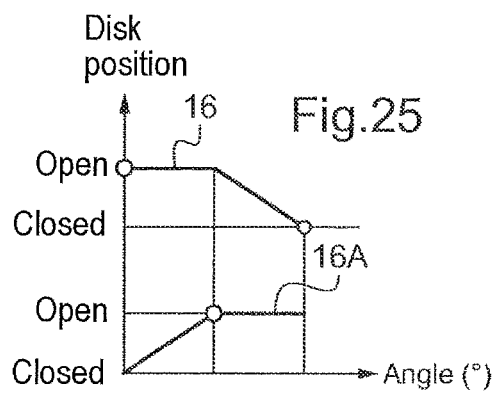
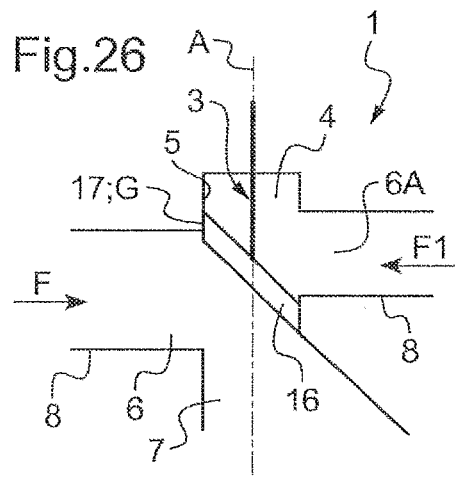
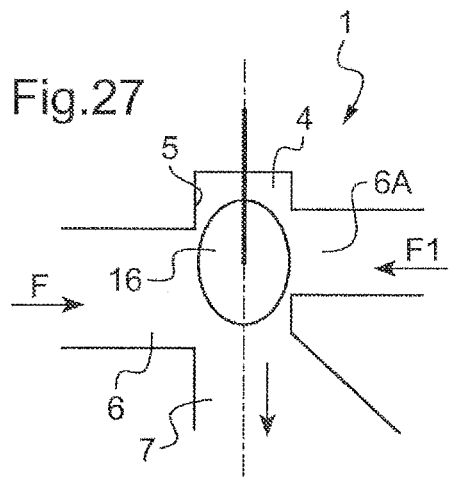
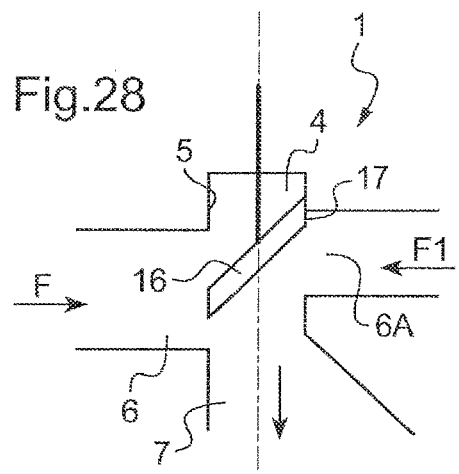
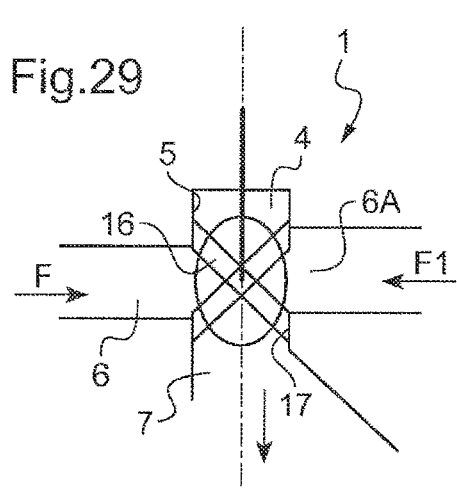
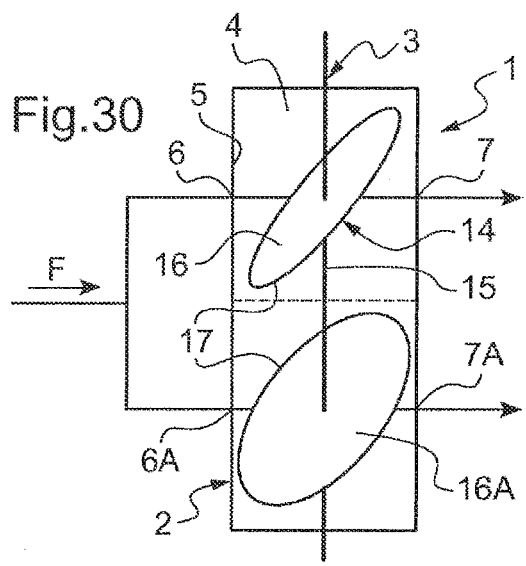

VALVE FOR CONTROLLING A FLOW OF FLUID, INCLUDING A ROTARY CLOSURE MEANS

The present invention relates to a valve for the flow of fluid of the type having a rotary closure means, which valve is intended more particularly though non-exclusively to be fitted to fluid circulation systems which are associated with internal combustion engines, whether they be of the petrol or diesel type, of vehicles, in particular motor vehicles.

Such valves may have different functionalities and, for example, when they are provided in turbocharger type diesel engines, they may be used to meter the quantity of air introduced into the intake line of the engine, or to branch off a portion of the exhaust gases which flow in the exhaust line and to convey it in the direction of the intake line, in particular for the purposes of processing the nitrogen oxides. The valves according to the invention thus particularly involve the valves which allow the flow of gas.

There are known in this regard valves comprising a member which is capable of allowing the passage of fluid and a controllable closure means which is arranged in the member and which can occupy, by means of rotation thereof relative to the member, different functional positions between two limit positions, a closed position for which the flow of the fluid is interrupted and an open position for which the flow of the fluid is at a maximum, respectively.

The closure means is generally a valve member, at the periphery of which there is provided a chamfer and which is mounted so as to be fixedly joined to an axle located in the plane of the valve member and which can be controlled in terms of rotation in order to rotate the valve member. In this manner, in the closed position, the valve member is perpendicular to the flow of fluid with the portion of the chamfer being pressed in a sealing manner against the wall of a conduit of the member and closing the flow of fluid through the valve. As a result of the controlled 90° rotation of the axle in the only possible direction imposed by the chamfer in abutment against the wall, however, the valve member is neutralized and allows the flow of fluid while being parallel with the conduit.

This rotating valve member is limited to a single direction of opening/closing and therefore cannot close in a sealing manner at the two sides or faces thereof. Furthermore, the assembly of the closure means is difficult with a large number of steps, such as the positioning of the axle through the conduit, then the valve member being inserted into the conduit and into the axle, the valve member being positioned, in the closure position, and the axle being rotated so that the periphery of the valve member conforms to the conduit and brings about self-centering of the valve member, the valve member being fixed to the axle in the position found and the leakage being adjusted so that the valve member does not damage the conduit, by means of an adjustment screw.

That being the case, there are also known valves which allow the provision of two closure positions by means of a half-turn of the valve member. In such valves, since the valve member is generally screwed or welded to the connection axle in one of the closed positions, the level of leakage will be good (without any leakage) in this position but will remain poor (with leakage) at the other side, after rotation through 180°. That is mainly because of misalignment of the rotation axis relative to the axis of the conduit, which misalignment is difficult to avoid because it arises from the production itself of the components. This is because the components bring about a positioning error of the introduction of the axle in the member and coaxiality errors of the bearings or the like for guiding the axle.

In this manner, if the sealing is achieved when the valve member is in a closure position in the angular position corresponding to the position in which the valve member has been mounted on the axle, however, the sealing will not be obtained after a rotation through 180° because of the misalignment which occurs with the rotation of the valve member. More specifically, that misalignment will bring about a leak zone at one side of the valve member and an interference zone at the diametrically opposed side between the valve member and the conduit, further risking the failure of the valve member being brought about.

An object of the present invention is to overcome these disadvantages and the invention relates to a fluid flow valve whose configuration particularly allows closure in a plurality of angular positions, with an optimum level of leakage.

To this end, the valve for controlling the flow of fluid is of the type comprising:
- a member which is capable of allowing the passage of the fluid and
- a controllable rotary closure means which is arranged in the member and which can occupy, as a result of rotation of the means relative to the member, different angular positions.

According to the invention, the valve is remarkable in that the member comprises a cylindrical internal housing which has a circular cross-section, and in that the controllable rotary closure means comprises at least one closure portion which is in particular elliptical and which is arranged in an inclined plane relative to the cylindrical housing and which cooperates with the side wall of the housing by means of a peripheral generatrix so as to ensure sealing contact between the closure means and the member in at least one angular position.

In this manner, as a result of the invention, there is obtained, in a closure position of the valve, sealing over the whole of the periphery of the valve member, without using chamfers. The closure portion can further rotate through 360° and, in a closure position, will ensure the sealing with the side wall of the housing as a result of the continuous contact therebetween which is given by the inclination of the closure portion with the wall of the housing, since the closure portion rotates in one direction or the other. It is also possible in accordance with the configuration of the valve to provide for a plurality of closure positions, for example, two positions which are spaced apart by 180°, which are sealed over the whole of the periphery of the valve member.

Preferably, the inclined portion of the closure means is formed as a rotary disk whose peripheral edge constitutes the contact generatrix with the side wall of the cylindrical housing, in particular so as to ensure cylinder-on-cylinder contact. In this manner, the projection of the inclined rotary disk, along the rotation axis, in the cylindrical housing is circular and the disk cooperates excellently with the side wall thereof having a corresponding cross-section. The simplicity of construction of the inclined closure portion should be noted, and further allows, as set out above, leaks to be prevented in the closure position of the disk.

The inclined closure portion forms, for example, an angle of substantially 45° with the axis of the cylindrical housing of the member.

Advantageously, the closure means comprises a control rod which is connected to the inclined portion in order to drive it in rotation and which is arranged in the axis of the cylindrical housing which extends through the center of the inclined portion. That rod thus simply carries the disk at the end so that this construction of the closure means does not involve the axle which generally extends along the valve member and brings about the assembly difficulties and the risks of leakage and interference connected with the misalignment.

This is because the valve member is no longer in the plane of the rotation shaft thereof, which reduces the occurrences of interference between those two components. Furthermore, the valve member as a result of its symmetry may be mounted equally well in both directions without using an encoding means.

In particular, the rod and the inclined portion of the closure means may be produced in one piece or assembled so as to be fixed to each other by means of overmolding, welding, bonding, a fixing element, etc.

Preferably, at the side opposite the inclined closure portion, the rod is mounted in a guiding bearing which is fixedly joined to the member and/or is connected at the outlet thereof to a rotational driving device.

The invention also relates to a fluid flow system comprising:
 a branching loop for branching off a fluid,
 a valve as described above, in which there are arranged in the member a main inlet and outlet for the fluid, which open substantially in a coaxial and radial manner relative to the internal cylindrical housing with the closure means separating them in at least one of the angular positions thereof, and a secondary inlet and outlet,
 the branching loop being connected to the housing of the member by the secondary inlet and outlet so as to branch off the fluid toward the loop when the inclined portion of the closure means closes the connection between the main inlet and outlet.

Finally, the invention relates to a fluid flow system comprising:
 a branching loop for branching off a fluid,
 a valve as described above, the closure means of the fluid comprising, in the internal cylindrical housing of the member, two inclined portions, one after the other, along the axis of the housing, the valve being configured to allow a flow of the fluid along the axis of the housing, in at least one angular position of the closure means, and, in at least one other angular position of the closure means, a flow in the branching loop which is connected to the internal housing of the member, between the two inclined portions of the closure means and downstream of the second inclined portion, respectively.

The two inclined portions of the closure means may be controlled by a single rod which is fixedly joined thereto, and in the member there may be arranged a fluid inlet before the first inclined portion, and a fluid outlet which is downstream of the second inclined portion and which opens in the internal housing, the inlet and outlet being arranged parallel with each other.

Different embodiments of the control valve including at least one inlet and one outlet of at least one fluid passing through the housing of the member having a rotary closure means will be described below with reference to the appended Figures which will clearly explain how the invention may be carried out. In those Figures, identical reference numerals refer to similar elements.

FIGS. 16 and 17 are similar to FIGS. 11 and 12, this time for the valve of FIGS. 13 to 15.

FIG. 18 is a graph representing the law of opening of the disk of the valve above, that is to say, the position of the disk in the housing as a function of the rotation angle of the closure means.

FIGS. 19, 20 and 21 are schematic plan views of a third embodiment of the valve, to which there is connected a branching loop with reversal of the circulation flow of the fluid, in accordance with three operating positions, respectively.

FIGS. 22, 23 and 24 are schematic plan views of a fourth embodiment of the valve which has double closure means and to which there is connected a branching loop of the circulation flow of the fluid, in accordance with three operating positions, respectively.

FIG. 25 is a graph representing the laws of opening of the two disks of the closure means of the valve of FIGS. 22 to 24.

FIGS. 26, 27, 28 and 29 are schematic plan views of a fifth embodiment of the valve with two fluid inlets and a fluid outlet.

FIG. 30 is a schematic view of a sixth embodiment of the valve having a double closure with two fluid inlets and two fluid outlets.

Figure 1:
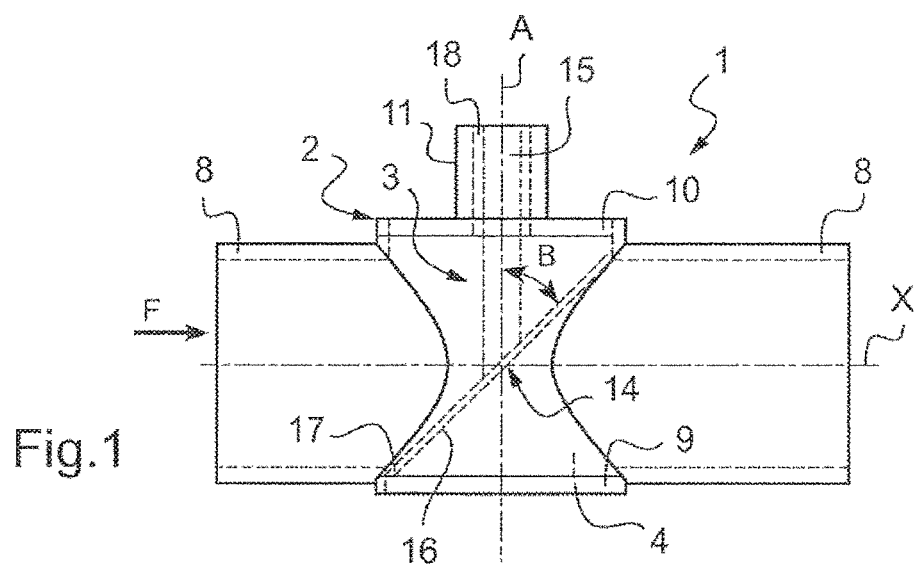
FIG. 1 is an external plan view of a first embodiment of the control valve according to the invention.
Figure 2:
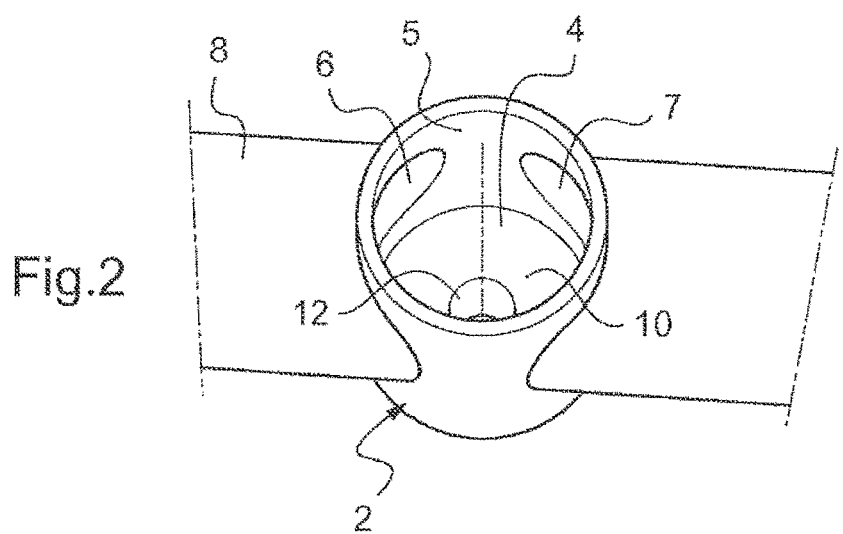
FIG. 2 is a perspective view of the member of the valve with, in this first embodiment, an inlet and an outlet which are coaxial for the flow of the fluid.
Figure 3:
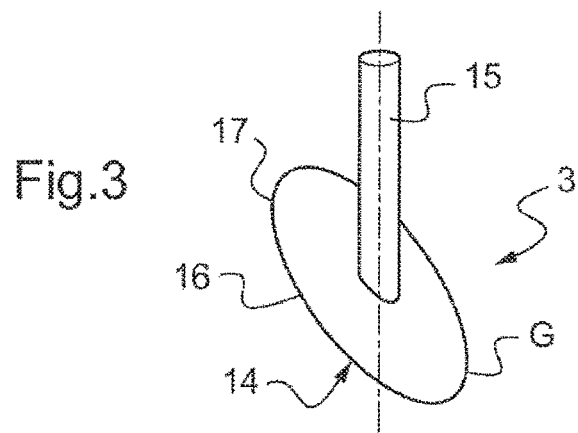
FIG. 3 is a perspective view of the rotary closure means of the valve.

The control valve 1 illustrated in FIGS. 1 to 3 according to a first embodiment is, for example, intended to ensure the metering of air introduced into the intake line of a diesel engine, it being understood that it could have any other function.

It comprises two important components, that is to say, a member 2 (FIG. 2) and a closure means 3 (FIG. 3). In particular, the member 2 of the valve 1 is provided with an internal housing 4 which is cylindrical having an axis A and a circular cross-section and which is delimited by a side wall 5. That internal housing may be likened to a bore. In the wall thereof, an inlet 6 and an outlet 7 open radially relative to the axis A and form two paths for the fluid which is intended to flow through the housing of the valve. That inlet 6 and outlet 7 are, for example, aligned relative to each other. In this instance, they have a longitudinal axis X which intersects perpendicularly with the axis A of the housing 2, and have identical diameters. They continue beyond the side wall 5 of the housing by means of conduits 8 which are integrated in the member 2 and which are intended for connection with the circuit (line) which is provided with the valve.

Figure 4:
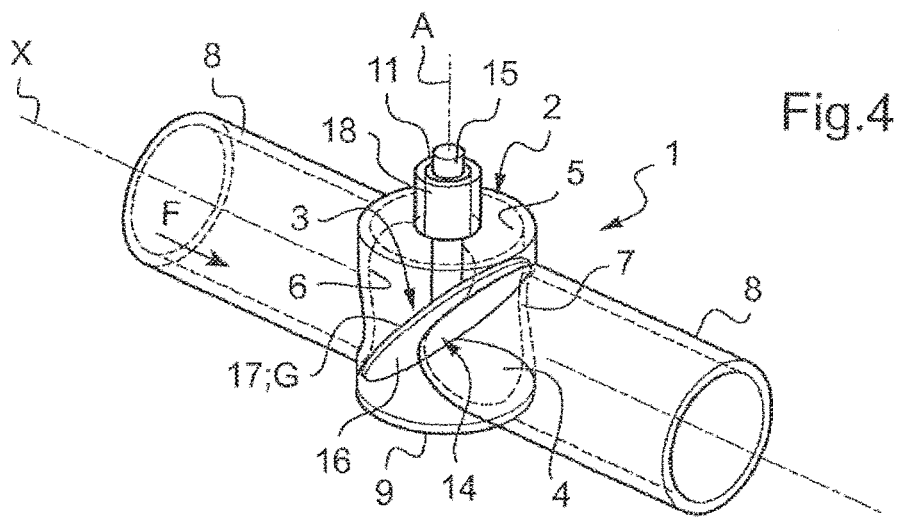
FIG. 4 is a perspective view, in a transparent manner, of the valve with the closure means mounted in the member of the valve and in a closure position thereof.

It can further be seen in FIGS. 1, 2 and 4 that the internal cylindrical housing 4 is completely closed by a transverse base 9 at one of the ends thereof, while at the opposite end thereof there is a transverse cover 10 which continues as an end piece 11 with an axial hole 12. The closure means 3, which cooperates with a drive device (not illustrated) which is controlled by a control unit known per se in order to drive the closure means 3 in rotation about the axis A, extends through the axial hole.

As can better be seen with reference to FIGS. 3 and 4, the closure means 3 has according to the invention an inclined closure portion 14 and a connection rod 15. In particular, the inclined portion 14 is formed as an elliptical valve member 16 which is arranged in a plane which is inclined with respect to the axis A of the circular cylindrical housing 2 and which is centered relative to the axis A so that the peripheral edge 17 thereof is in constant contact with the side wall 5 of the housing 4 so as to isolate the inlet 6 and the outlet 7 in at least one given angular position of the closure means in order to interrupt the flow of fluid, or to place the inlet 6 and the outlet 7 in fluid communication with a flow which can be adjusted in accordance with the given angular opening at the closure valve member. That peripheral edge 17 thus constitutes a generatrix G which is always in sealing contact with the side wall 5 of the housing.

The term "inclined" is intended to be understood to be strictly between 0° and 90°. The term "valve member" is intended to be understood to be a component which has two surfaces which are inclined relative to the axis A and which are connected by the peripheral edge 17. The inclined surfaces are optionally parallel with each other. The component has a small thickness, that is to say, a distance between the inclined surfaces which is far less than the diameter of the member 2, in particular ten times less. The component is, for example, a disk.

Geometric considerations are taken in order to ensure the correct operation of the valve 1. The valve member 16 is of elliptical shape having a long axis which is greater than the diameter of the circular housing 4 and a short axis which is substantially less than the diameter of the circular housing 4. In this instance, the diameter of the circular housing 4 is further greater than the identical diameters of the fluid inlet 6 and fluid outlet 7. The connection rod 15 is arranged in accordance with the axis A of the housing so as to be centered relative to the inclined disk, with the angle B between the inclined plane of the disk and the axis A being 45° in this instance. In order to have constant contact with the side wall 5 of the housing, the long axis of the disk 16 is therefore substantially equal to the diameter of the housing multiplied by $\sqrt{2}$. That contact may be defined to be a cylinder/cylinder contact between the wall 5 having a circular cross-section of the housing 4 and the generatrix G which corresponds to the peripheral edge 17 of the inclined disk 16 and which is circular in projection onto a plane perpendicular to the rotation axis of the valve member. The short axis of the valve member 16 may be substantially greater than the diameter of the fluid inlet 6 and fluid outlet 7.

Furthermore, the assembly of the closure means 3 in the housing 4 of the member of the valve does not require any difficult adjustment operation as previously, only placement into axial abutment of the means 3 in the housing being required to center the disk 16 relative to the fluid inlet and fluid outlet.

The rod 15 is associated, by one of the ends thereof, with the disk 16, by assembly or overmolding, or it is formed with the disk, so as to have a monobloc closure means 3. By way of example, the disk 16 may be of plastics material and the rod 15 may be of metal, or vice versa, or the two components may be of plastics material or of metal in accordance with the monobloc construction or composite construction selected. The other end of the rod extends through the axial hole 12 of the end piece 11 by means of a guiding bearing 18, and is connected to the rotational drive device (not illustrated).

Figure 10:
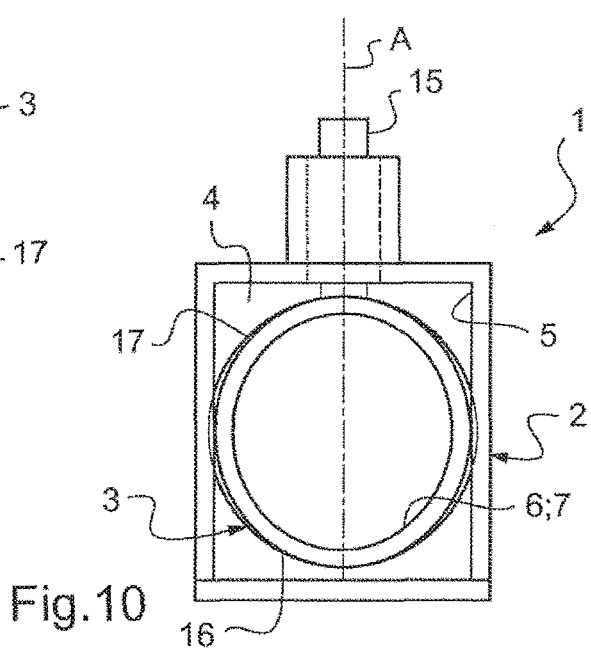

In the position illustrated with reference to FIGS. 4 and 10, the inclined disk 16 of the closure means 3 isolates the inlet 6 from the outlet 7, preventing the flow of the fluid through the valve 1. To that end, it can be seen that the peripheral edge 17 of the inclined disk 16 cooperates with sealing and completely with the side wall 5 of the cylindrical housing 4, in the manner of a partition separating the housing into two internal chambers which are distinct and sealed, each one directed toward one of the inlet path 6 and outlet path 7 for the passage of fluid. That angular position of the inclined disk 16 and therefore of the closure means 3 corresponds to the closure of the valve 1 with, as a point of origin, zero angular rotation of 0° of the closure means 3, the drive device thereof via the rod 15 being inactive.

Figure 5:
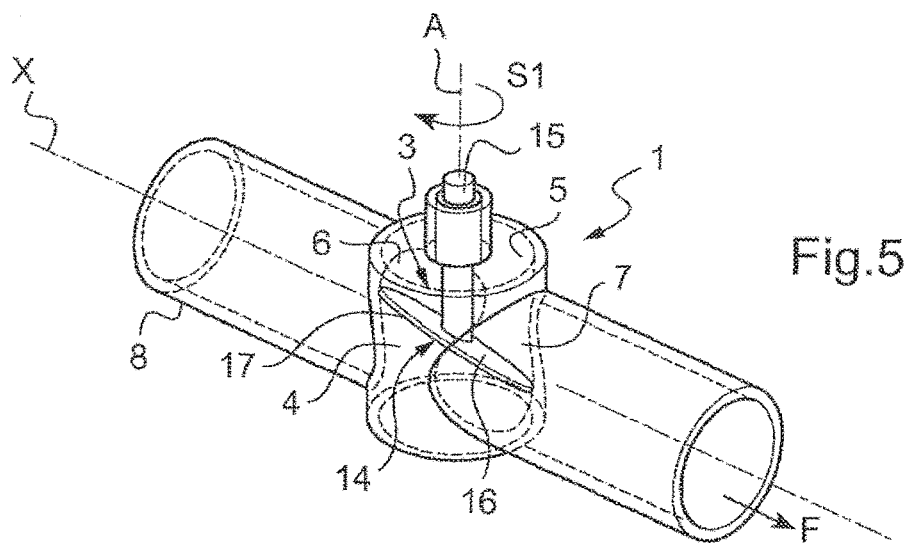
FIGS. 5 and 6 are perspective views, in a transparent manner, of the valve with the rotary closure means in an open position at +90° and −90°, respectively.
Figure 7:
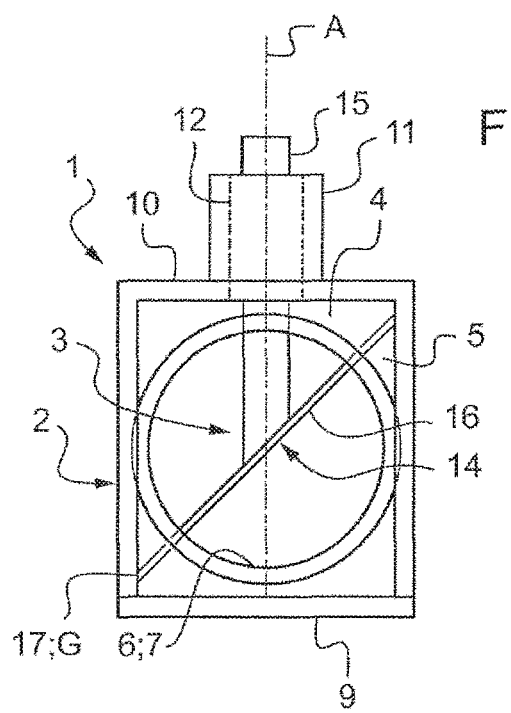
FIGS. 7 to 10 are cross-sections of the positions of the rotary closure means in opening positions of 90°, 45°, 5° and closure positions of 0° or 180°.

When the drive device is urged, it brings about the rotation of the closure means 3 in accordance with the desired angle corresponding to a predetermined flow rate of the fluid through the valve 1. With reference to FIGS. 5 and 7, the closure means 3, via the rod 15 thereof, has been subjected to a rotation of +90° in the clockwise direction S1 about the axis A, so that the inclined disk 16 has rotated in the housing 4 in order to be in a plane substantially parallel with the coaxial conduits 8 which delimit the inlet 6 and the outlet 7 of the member 2 of the valve. As a result of the rotation, the peripheral edge 17 is no longer in complete contact with the side wall 5 of the housing, but only in partial contact because opposing portions of the edge 17 are opposite the circular inlet and outlet 6 and 7. That neutralized angular position of the disk allows the passage of the fluid between the inlet 6 and the outlet 7 via the sealed internal housing 4 of the body, and corresponds to full opening of the valve 1 for which the circulation flow of the fluid is at a maximum.

Figure 6:
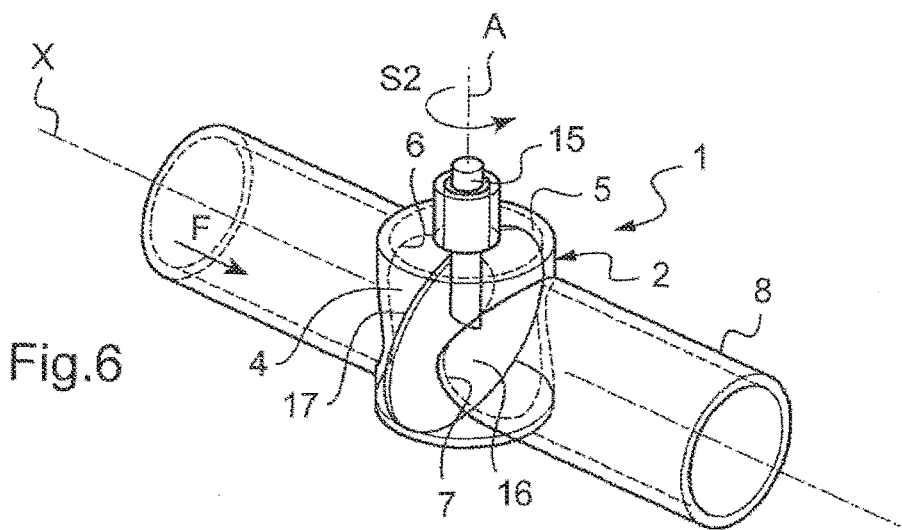

The position occupied by the inclined disk 16 and illustrated with reference to FIG. 6 is symmetrical to the preceding one, that is to say that the closure means has rotated under the action of the drive device through −90° in the counter-clockwise direction S2 relative to the closure position of 0°. In this manner, the inclined disk 16 is parallel with the coaxial inlet 6 and outlet 7 of the fluid ensuring a maximum flow through the valve. It is thereby possible to operate the valve 1 in the two directions from a central closure position.

Figure 8:
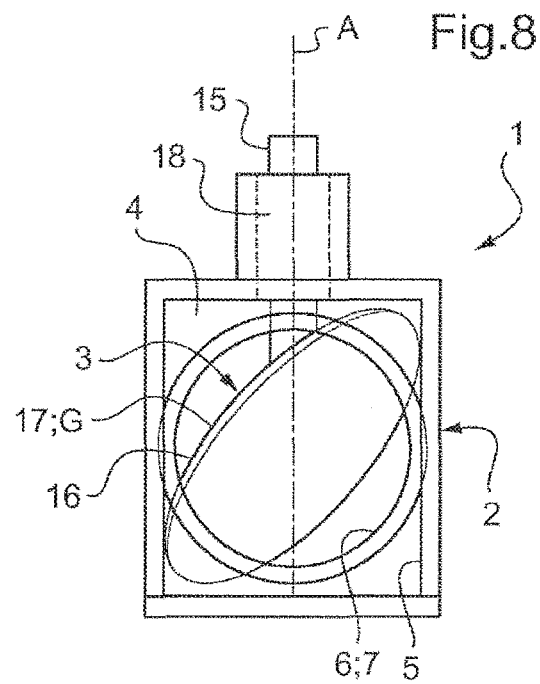

An intermediate position of the closure means 3 is illustrated by way of example with reference to FIG. 8, which position corresponds to a rotation of +45° of the inclined disk 16 about the axis A. The edge 17 of the disk is then partially opposite the inlet 6 and the outlet 7, placing them in communication for the passage of the fluid under medium flow.

Figure 9:
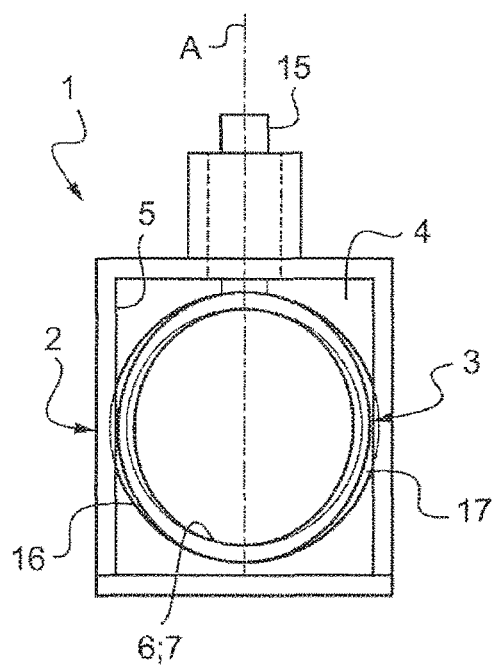

As regards FIG. 9, it shows that the edge 17 of the inclined disk 16 is completely in contact with the side wall 5 of the housing when the closure means is at approximately 5° from the initial closure position of 0°. That means that the total coverage of the disk 16 and the housing 4 allows an angular error to be accepted during the assembly without reducing the level of sealing of the valve. The closure of the valve is finally achieved over an angular range of approximately 10° (+ or −5°).

It should also be noted that, as a result of the configuration of the inclined disk in a cylindrical housing with cylinder/cylinder contact, the closure position of the valve may be reached either by the return of the closure means 3, under opposing rotation of 90°, from the fully open position to the closure position, or by carrying out an additional rotation of 90° in order to bring the disk into a closure position. In the latter case, the inclined disk 16 has pivoted through 180°. It may thus be advantageously used at the two sides equally well because only the peripheral edge thereof makes contact with the side wall of the housing. The disk therefore has two closure positions for a rotation of 360°.

Figure 11:
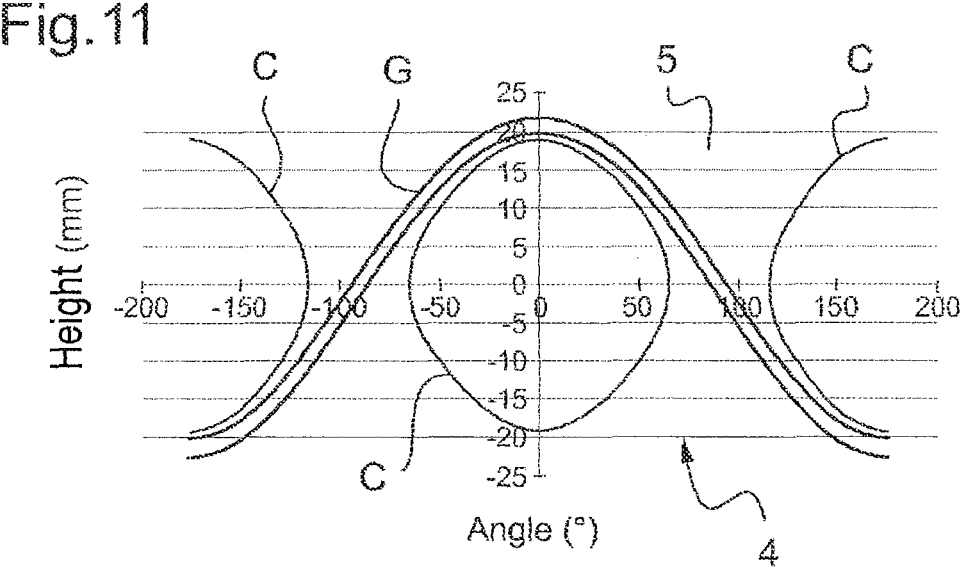
FIGS. 11 and 12 are graphs representing the contact zone of the disk of the rotary closure means in a maximum closure position and opening position, on the housing of the member of the above valve, illustrated in the flat state.
Figure 12:
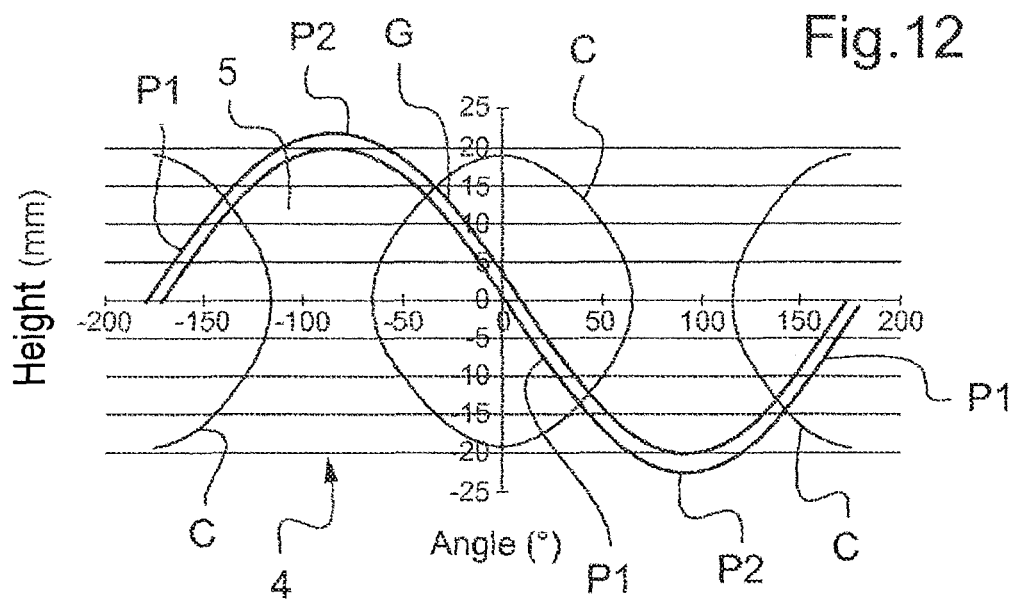

The graphs of FIGS. 11 and 12 clearly show the position of the inclined disk 16 in accordance with the height (mm) of the side wall 5 of the housing, which wall of 360° is developed from −180° to +180° in order to be illustrated as a plan view.

In FIG. 11, the inclined disk 16 of the closure means 3 occupies the closure position of the valve 1 (FIGS. 4 and 10), that is to say, with a zero rotation of the means. In relation to the inlet 6 and the outlet 7 which have identical diameters less than that of the housing and which are illustrated by the contour C of the conduits 8 which delimit them, it can clearly be seen that the peripheral edge 17 which forms the generatrix G of the disk and which is illustrated as a plan view in accordance with a sine wave, is constantly in contact with the side wall 5 of the housing. In that manner, the closure of the valve is complete, the inlet 6 and the outlet 7 being completely isolated from each other which prevents any flow of the fluid through the valve 1.

With reference to FIG. 12, the inclined disk 16 occupies the fully open position of the valve (FIGS. 5, 6 and 7), that is to say, with a 90° rotation of the closure means 3. In that case, it can clearly be seen that the peripheral edge 17 in the form of a sine wave (offset through Π/2 relative to FIG. 11) then extends largely (reference P1) via the inlet 6 and outlet 7, at the center thereof. Only the other portion (reference P2) of the edge 17 remains in contact with the side wall 5 of the housing, which clearly shows the fully open state of the valve 1 for a maximum fluid flow, through it.

Such a valve consequently ensures the sealing in the two closure directions by adaptation of the inclined disk in the circular housing (cylinder/cylinder contact), which disk, as a result of its symmetry, may be assembled in the member of the valve equally well in both directions without any encoding means. Furthermore, since the edge of the disk moves linearly over the cylindrical wall, that prevents fouling between the disk and the wall and ensures self-cleaning of the valve, which is beneficial when it is an EGR valve.

Figure 13:
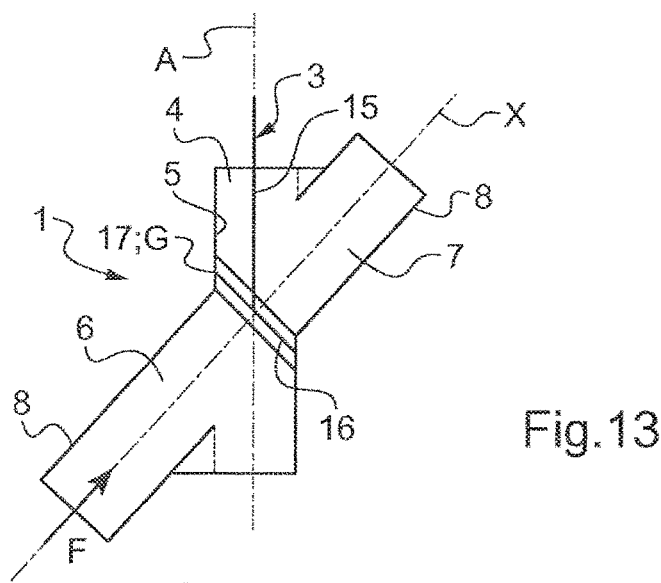
FIGS. 13, 14 and 15 are schematic plan views of a second embodiment of the valve which allows a single closure for a rotation of the closure means through 360°.
Figure 14:
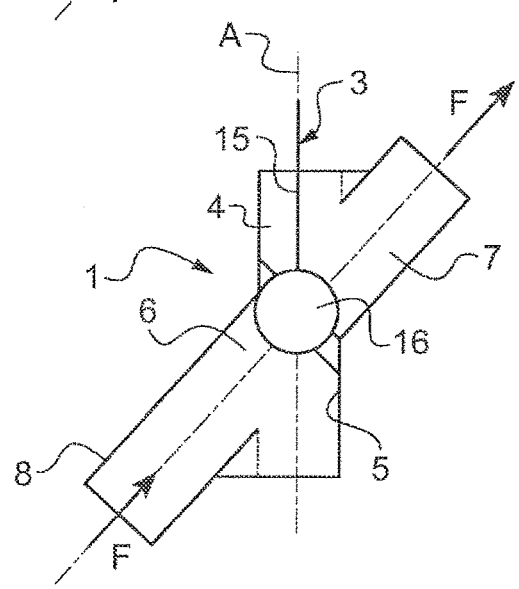
Figure 15:
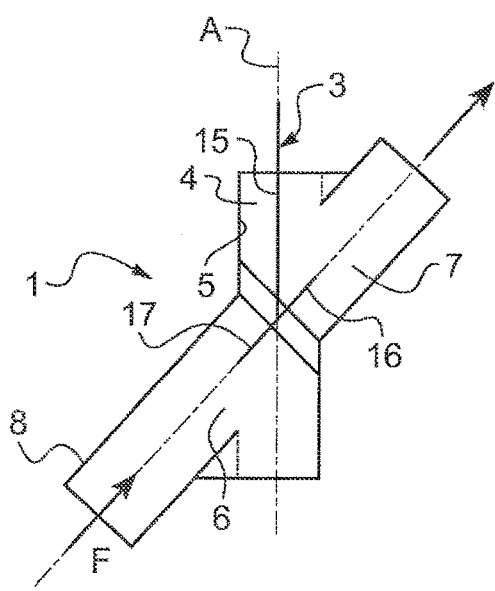

In the second embodiment illustrated schematically in FIGS. 13 to 15, the control valve 1 is configured to propose only one closure per rotation through 360° of the closure means (in place of two closures in the preceding method). To that end, if the closure means 3 and the cylindrical housing 4 having an axis A of the member 2 remain identical, instead the inlet 6 and outlet 7 are arranged differently, in the sense that they are no longer aligned perpendicularly relative to the axis A, but they are aligned obliquely relative to the axis A of the housing. More specifically, the axis X of the two conduits 8 which delimit the inlet 6 and outlet 7 is perpendicular to the plane of the inclined disk 16 when it occupies the closure position of the valve, that is to say that it forms an angle of 135° with the axis A of the housing.

In this manner, the intersection of the circular inlet 6 and outlet 7 with the side wall 5 of the member provides communication contours C1 which are more elongated, substantially elliptical, so as to obtain a specific flow law over a rotation of 360° of the rod of the closure means.

In FIG. 13, the peripheral edge 17 (generatrix G) of the inclined disk is completely in contact with the side wall 5 of the housing, therefore corresponding to the closure position of the valve. As a result of the rotation of the rod 15 of the drive means 3, the inclined disk 16 rotates in order to progressively take up an open position after a 90° rotation (FIG. 14) as far as a fully open position after a 180° rotation (FIG. 15). The plane of the disk is then parallel with the coaxial inlet 6 and outlet 7 and the peripheral edge 17 thereof is only partially in contact with the side wall 5 of the housing 4.

Therefore, it will be understood that, by the rotation of the closure means 3 being continued, the disk will reduce the open cross-section of the inlet and outlet and therefore the passage of the fluid, until passage is interrupted after a rotation of 360°.

As may be seen in the graphs of FIGS. 16 and 17, with a definition similar to the graphs of FIGS. 11 and 12, when the valve 1 is in a closure position for a zero rotation (0°) of the closure means, the entirety of the periphery of the edge 17 of the inclined disk 16 is in contact with the side wall 5 of the housing (cylinder/cylinder contact between the wall and the generatrix of the disk).

Furthermore, the contours C of the first embodiment and the contours C1 of the second embodiment are illustrated, which comparison between the two contours shows a cross-section of passage of fluid which may be greater with the contours C1. That is particularly representative in the diagram of FIG. 15 in which the disk 16 has been subjected to a 180° rotation with respect to the plane thereof parallel with the axis X of the conduits 8 of the inlet 6 and outlet 7 for the complete opening of the valve 1. The edge 17 of the inclined disk is, as above, more in a state facing the inlet 6 and the outlet 7 (portion P1 of the edge) than it is in contact with the side wall of the housing (portion P2).

The opening law of the disk in this second embodiment of the valve is shown in FIG. 18 and illustrates the position of the disk as a function of the angle of rotation between 0° and 180°. The symmetrical portion of the line relative to the axis of the ordinates (0° to −180°) is not illustrated. It can be seen that the closure position of that valve is obtained only once at 0°, then increases linearly toward an open position up to 90° in order to be in a fully open position substantially from 90° to 180°.

In the third embodiment illustrated in FIGS. 19 to 21, the control valve 1 has a structure similar to the first embodiment. It is further configured to communicate with an additional branching loop or bypass 20.

In this manner, in addition to the aligned fluid inlet path 6 and outlet path 7 which are described as main and perpendicular paths with respect to the axis A of the housing 4, in the member 2 there are connected an inlet 21 and an outlet 22 of the loop 20, which are described as secondary paths and which, for one, is arranged in the transverse base 9 of the housing, that is to say, directed toward a side of the closure disk 16 and, for the other, in the wall 5 of the housing, directed toward the other side of the disk. In a non-limiting application example, the loop 20 comprises a cooler 23 in order to cool the fluid being circulated when it is found to be necessary.

When the inclined disk 16 of the closure means 3 is in the fully open position illustrated with reference to FIG. 19, with the plane thereof in the axis of the conduits 8 of the main inlet 6 and outlet 7, the circulation flow of the fluid F is at a maximum and passes through the internal housing 4 of the valve 1 without passing via the cooling loop 20. In that manner, the fluid such as air is not cooled.

As FIG. 20 shows, following the 90° rotation in a direction about the axis A of the housing, the inclined disk 16 is in a closure position with the edge 17 thereof (generatrix G) in cylinder/cylinder contact over the entire periphery thereof with the side wall 5 of the housing. In that manner, the fluid no longer communicates directly between the main inlet 6 and outlet 7 but instead is discharged from the main inlet 6 in order to reach the housing 4 and to be directed, by the closure disk being closed, in the direction of the secondary inlet 21 of the branching loop 20, in the counter-clockwise direction, arrow F. The fluid then passes through the cooler 23 in which it is cooled, then is discharged via the secondary outlet 22 of the loop 20 in order to be introduced into the housing 4 then to pass via the main outlet 7 of the valve.

On the other hand, the flow of the fluid F with reference to FIG. 21 is brought about in the opposite direction to that above, by rotating the closure means 3 through 90° in the other direction relative to the closure position of FIG. 19. The inclined disk 16 again ensures, in this position, the closure of the valve 1. In that manner, the fluid passes through the cooling loop 20 in the clockwise direction by following the main inlet 6, the housing 4, the secondary inlet 22 (acting as an outlet here), the loop 20, the secondary outlet 21 (acting as an inlet here), the housing then the main outlet 7. In this manner, a reversal of the flow of the fluid is obtained.

In the fourth embodiment illustrated in FIGS. 22, 23 and 24, in addition to the preceding branching loop 20, the valve 1 comprises a second inclined disk 16A which is arranged in series with the (first) initial inclined disk 16, in the housing 4, in accordance with the axis A. It is intended to be understood thereby that the disks 16, 16A are one after the other or one below the other along the axis A. In particular, the two inclined disks 16, 16A are controlled by the same rod 15 which is connected to the rotation drive device of the closure means 3 and they are arranged in the internal housing 4. The rod is then mounted, for the purposes of guiding and centering, in bearings in the region of the opposing transverse bases 9 and 10 of the member. There are provided in the wall 5 of the housing the main inlet 6 and outlet 7 which are arranged, no longer in the same axis, but instead in a parallel manner in a plane extending through the axis A, with the inlet 6 facing the disk 16, for example, and the outlet 7 facing the disk 16A. The branching loop 20 having a cooler 23 is connected via the secondary inlet 21 which is located here axially between the two disks and via the secondary outlet 22, located in this instance downstream of the disk 16A.

In functional terms, the valve is configured to allow a flow of the fluid along the axis A of the housing in at least one angular position of the closure means and, in at least one other angular position of the closure means, a flow in a branching loop which is connected to the internal housing of the member, between the two inclined portions of the closure means and downstream of the second inclined portion, respectively. More specifically, when the two inclined disks 16 and 16A of the closure means 3 are controlled in order to take up the position illustrated in FIG. 22, the disk 16 is in the opening range thereof, while the disk 16A is in a closed position, the peripheral edge 17A thereof being in complete contact with the wall 5 of the housing 4. In that manner, the air from the inlet 7 reaches the housing by passing through the disk 16 then, since the other disk 16A is closed, is introduced into the branching loop 20 via the inlet 21 and passes through the cooler 23. It is then discharged in the cooled state via the outlet 22 in order to be directed toward the outlet 7 of the valve which allows cooling in this position.

When the two inclined disks 16 and 16A which are controlled by the same rod 15 pivot through 90° relative to the axis A of the housing (FIG. 23), they are both open so as to allow the air to pass directly via the housing which then constitutes a branching path without passing via the cooling loop 20. The pressures at the inlet and the outlet of the loop are the same, with no flow inside.

When the two inclined disks 16 and 16A pivot again through 90°, one disk 16A remains in the opening range thereof while the other disk 16 takes up the closure position thereof and blocks, by means of the edge 17 thereof in complete contact with the side wall 5, the arrival of the air in the housing of the valve member. The pressures at the inlet and outlet of the loop 20 are also the same in that instance so that there is no flow. The valve 1 is in a stop position.

The chart of FIG. 25 summarizes the behavior of the control valve with the two inclined closure disks thereof.

For a position of the closure means at 0°, the disk 16 is open and the disk 16A is closed so that 100% of the air from the inlet 6 passes via the loop 20 and is cooled in order to be discharged from the valve.

For a position at 90°, the two disks are open but the cooling loop 20 is not used because there is the same pressure between the secondary inlet and outlet 21, 22; 100% of the air flows via the path of the housing 4, without cooling.

For a position at 180°, the disk 16 is closed so that the air is not introduced into the valve; the position of the other disk 16A is therefore unimportant.

The position between 90° and 180° corresponds to the variable metering portion of the fluid.

In the fifth embodiment of the valve 1 which is illustrated in FIGS. 26 to 29, the housing 4 comprises an inclined closure disk 16 which is similar to the preceding first three embodiments and which cooperates with the side wall 5. However, two inlets 6 and 6A for two separate fluids F and F1 open radially and opposite each other in the housing 4 so as to be separated when the inclined disk occupies a specific position. The outlet 7 is further provided in the member 2, for example, in the axis A of the housing 4, in the region of the transverse base 9 thereof.

Such a construction allows a single disk 16 to control three paths, that is to say, two inlets for two fluids and an outlet for one or other fluid or an admixture of the two fluids.

When it is desirable to obtain the fluid F which is introduced via the inlet 6, the disk is in the position illustrated in FIG. 26, with the peripheral edge 17 thereof (generatrix G) in complete sealing contact with the side wall 5 of the internal housing, in order to place the inlet 6 exclusively in fluid communication with the outlet 7. The fluid flow path from the inlet 6 is open while the path 6A containing the other fluid F1 is then closed by the inclined disk 16. 100% of the fluid F from the inlet 6 passes the outlet 7.

As FIG. 27 shows, a 90° rotation of the inclined disk 16 allows the inlets 6 and 6A in the housing 4 to be uncovered and an admixture of the two fluids F and F1 to be obtained at the outlet 7 of the valve member. Another 90° rotation particularly allows priority for the fluid F1 from the inlet 6A relative to the fluid F from the inlet 6 in order to obtain at the outlet 7 of the valve 1 an admixture with a maximum proportion of the fluid F1 from the inlet 6A, as FIG. 28 shows.

To that end, the construction (shape, arrangement, diameter, etc.) of the opening of the inlet 6 is configured to allow such passage and to limit the fluid F therefrom when the inlet 6A of the fluid F1 is open to a maximum degree. There is provided, for example, an offset of the inlets 6, 6A in accordance with the rotation axis of the valve member and/or an inlet 6A having a smaller diameter than that of the inlet 6.

In order to have 100% of fluid from the inlet 6A in the appropriate position of the inclined disk, the forms of the openings of the inlets are consequently shaped, as FIG. 29, for example, shows with the two opposing positions of the disk in order to cause one or other of the two fluids to flow.

In the sixth embodiment illustrated schematically in FIG. 30, the valve 1 comprises in the housing 4 of the member 2 two inclined disks 16 and 16A which are arranged in series in accordance with the axis A, and which are controlled by the same rod 15. The two disks which form the closure means 3 here have an angular offset between them so that they are not in parallel planes. In FIG. 30, the angular offset between them is 60° but could be different in accordance with the law of opening/closure which it is desirable to have for the valve.

Furthermore, an inlet 6, 6A and an outlet 7, 7A of the fluid F for the respective disks 16, 16A open from the side wall 5 of the member so as to thereby allow specific laws of opening/closure in accordance with the angular positions of the disks. For example, it is possible to have a closure of the valve over an angular range of 60° of the two disks which block the inlets 6 and 6A by means of their contact with the wall 5 of the housing, a partial opening for one and/or other of the disks over another angular range and full opening of the valve over yet another angular range of the two disks corresponding to appropriate positions thereof in the housing with regard to the inlets and outlets.

Such a valve allows double metering of the fluid (air) with two offset disks which are controlled by a single rod and which require only a single machining operation of the housing for receiving the disks.

It should be noted that it is also possible to obtain such a result with two inclined disks in series and in parallel, but with the associated inlet and outlet pairs being offset angularly.

Furthermore, the invention is not limited to the embodiments described above and it will readily be understood that it is possible to obtain any type of law or graph of opening/closing the valve in accordance with the position of the rotary closure means (having one of more inclined disks) and the arrangement and the number of inlet and outlet paths for fluid(s) opening in the cylindrical housing of the member of the valve.

The invention claimed is:

1. A valve for controlling a flow of a fluid comprising:
a member through which said fluid passes; and
a controllable rotary closure means arranged in the member that occupies, as a result of a rotation of the controllable rotary closure means relative to the member and around a rotation axis, different angular positions, wherein
the member comprises a cylindrical internal housing comprising a circular cross-section,
the controllable rotary closure means comprises at least one closure portion which is arranged in an inclined plane relative to the cylindrical housing and which cooperates with a side wall of the cylindrical housing by a peripheral generatrix so as to make sealing contact between the controllable rotary closure means and the member, and
the member has a pair of an inlet and an outlet for the fluid, that are coaxial with respect to a flow of the fluid directed form the inlet to the outlet and open substantially in an oblique manner relative to the cylindrical internal housing, wherein the rotation axis of the controllable rotary closure means is aligned obliquely relative to the coaxial direction of the inlet, the outlet, and the fluid flow.

2. The valve as claimed in claim 1, wherein the inclined portion of the controllable rotary closure means is formed as a rotary disk whose peripheral edge constitutes the contact generatrix with the side wall of the cylindrical housing so as to ensure cylinder-on-cylinder contact.

3. The valve as claimed in claim 1, wherein the inclined closure portion forms an angle of substantially 45° with the rotation axis of the cylindrical internal housing of the member.

4. The valve as claimed in claim 1, wherein the controllable rotary closure means comprises a control rod which is connected to the inclined portion in order to drive the control rod in rotation and which is arranged in the axis of the cylindrical internal housing which extends through the center of the inclined portion.

5. The valve as claimed in claim 4, wherein the control rod and the inclined portion are produced in one piece.

6. The valve as claimed in claim 4, wherein, at a side opposite the inclined closure portion, the control rod is mounted in a guiding bearing which is fixedly joined to the member and/or is connected at the outlet thereof to a rotational driving means.

7. The valve as claimed in claim 1, wherein an axis of two conduits that delimit the inlet and the outlet is perpendicular to a plane of the inclined portion of the controllable rotary closure means when the inclined portion occupies a closure position of the valve.

8. The valve according to claim 1, wherein, the controllable rotary closure means closes the flow of the fluid from the inlet to the outlet only once per a 360° rotation of the controllable rotary closure means around the rotation axis.

\* \* \* \* \*